(12) United States Patent
Oliver

(10) Patent No.: US 6,425,186 B1
(45) Date of Patent: Jul. 30, 2002

(54) APPARATUS AND METHOD OF SURVEYING

(76) Inventor: Michael L. Oliver, 2319 Boonesborough Rd., Richmond, KY (US) 40475

(*) Notice: Subject to any disclaimer, the term of this patent is extended or adjusted under 35 U.S.C. 154(b) by 0 days.

(21) Appl. No.: 09/520,823

(22) Filed: Mar. 8, 2000

Related U.S. Application Data

(60) Provisional application No. 60/123,952, filed on Mar. 12, 1999.

(51) Int. Cl.[7] ................................................ G01C 3/00
(52) U.S. Cl. ........................ 33/293; 33/264; 33/DIG. 21
(58) Field of Search .......................... 33/263, 264, 293, 33/294, 295, 318, 333, DIG. 21

(56) References Cited

U.S. PATENT DOCUMENTS

| | | | |
|---|---|---|---|
| 3,430,349 A | * 3/1969 | Bunton et al. | ................ 33/333 |
| 3,762,058 A | * 10/1973 | Heater | .......................... 33/295 |
| 4,490,919 A | * 1/1985 | Feist et al. | ..................... 33/293 |
| 5,052,645 A | 10/1991 | Hixon | |
| 5,077,557 A | 12/1991 | Ingensand | |
| 5,233,357 A | 8/1993 | Ingensand et al. | |
| 5,255,441 A | * 10/1993 | Burgess et al. | ................ 33/295 |
| 5,512,905 A | 4/1996 | Nichols et al. | |
| 5,551,159 A | * 9/1996 | Mooty | .......................... 33/294 |
| 5,614,918 A | 3/1997 | Dinardo et al. | |
| 5,671,160 A | * 9/1997 | Julian | .......................... 33/293 |
| 5,734,348 A | 3/1998 | Aoki et al. | |
| 5,739,785 A | 4/1998 | Allison et al. | |
| 5,749,549 A | 5/1998 | Ashiaee | |
| 5,760,748 A | 6/1998 | Beckingham | |
| 5,760,909 A | 6/1998 | Nichols | |
| 5,821,900 A | 10/1998 | Kishimoto | |
| 5,835,069 A | 11/1998 | Skoog | |
| 5,859,693 A | 1/1999 | Dunne et al. | |
| 6,209,210 B1 | * 4/2001 | Stout | ........................... 33/293 |

* cited by examiner

*Primary Examiner*—G. Bradley Bennett
(74) *Attorney, Agent, or Firm*—King & Schickli, PLLC

(57) ABSTRACT

A method and apparatus for surveying is described whereby a selected survey point may be quickly and accurately located and marked. The apparatus comprises a prism pole with a mechanism for assuring the vertical orientation of the prism pole to the earth's surface, a satellite positioning system antenna mounted to the prism pole, and a marking device mounted to the prism pole for establishing a survey mark. The surveying apparatus is designed to be mounted to a wheeled vehicle for increased convenience to the user.

15 Claims, 2 Drawing Sheets

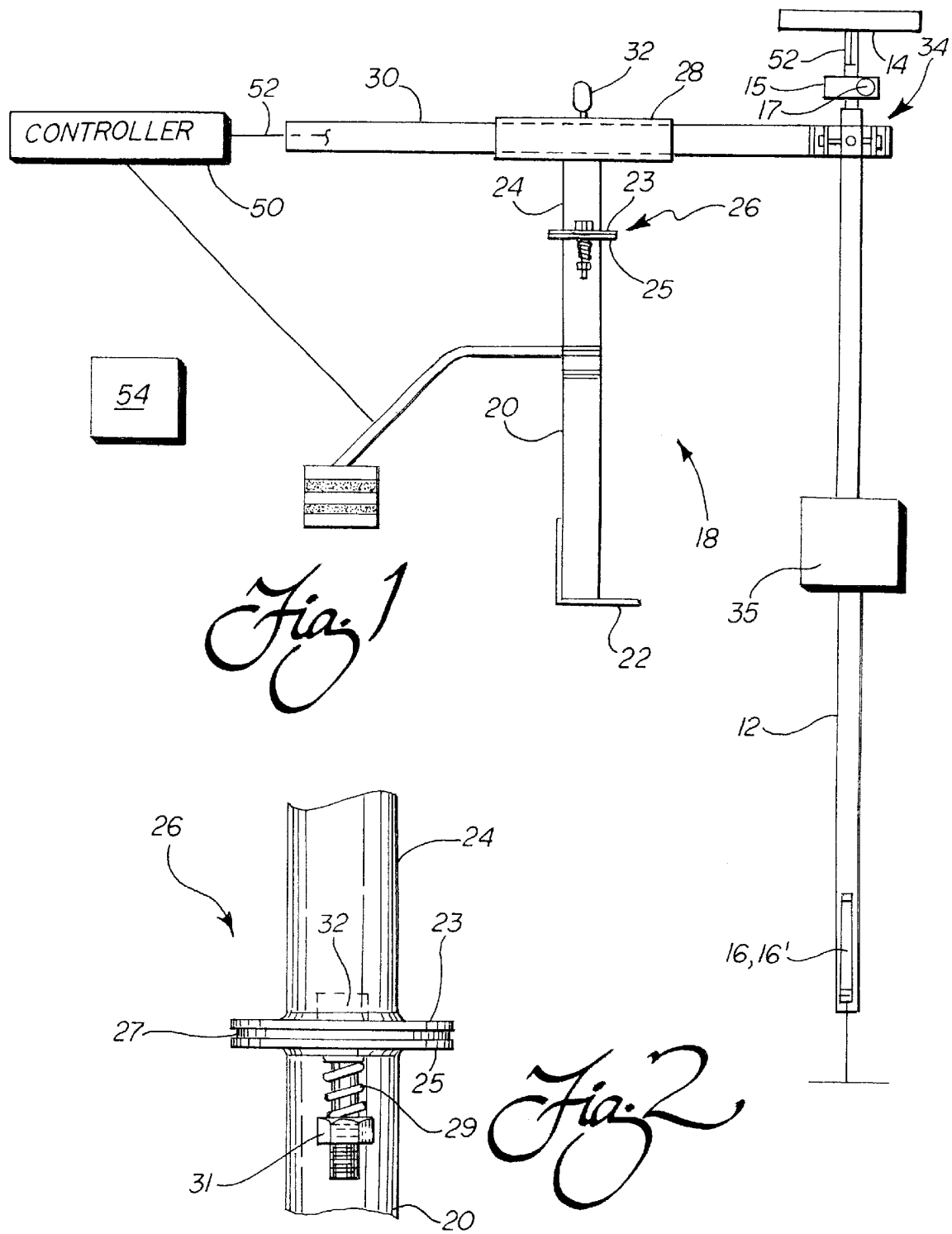

APPARATUS AND METHOD OF SURVEYING

This application claims the benefit of priority in provisional application Ser. No. 60/123,952, filed on Mar. 12, 1999.

TECHNICAL FIELD

The present invention relates generally to the surveying field and, more particularly, to an apparatus for and method of allowing accurate location and marking of a selected survey point upon the land.

BACKGROUND OF THE INVENTION

Surveying is the technique of measuring to determine the position of points or of marking out points and boundaries on land. In recent years the utilization of satellite positioning systems, such as the Global Positioning System (GPS) and Global Orbiting Navigational System (GLONASS), have been used to complete surveys. A satellite positioning system comprises a plurality of artificial satellites, radio receivers, computers and other equipment. Satellites transmit signals that indicate their positions relative to the receivers. Computers use these signals to determine the length of measured lines. Specifically, the principal method of using satellites for accurate positioning is based on the application of the Doppler effect. A radio signal is transmitted at a steady frequency by the satellite. A stationary receiving antenna detects a higher frequency as the satellite approaches and a lower one as it recedes. The speed of the frequency change depends upon the distance of the receiver from the satellite's track. As a consequence, a determination of this speed provides a measure of the distance. Since the track of the satellite over the earth's surface is known at all times, the data collected defines the position of the receiver. A receiver must obtain signals from at least three satellites to compute latitude and longitude and four satellites to compute elevation.

The use of satellite positioning systems in the field of surveying is described in, for example, U.S. Pat. No. 5,739,785 to Allison et al. and U.S. Pat. No. 5,859,693 to Dunne et al., as well as in the publications "Site Surveyor: Real Time GPS Survey System," Trimble Navigation, October 1992 and "GPS Satellite Surveying," by Alfred Leick, 1990, Wylie-Interscience Publication. The full disclosure of these patents and publications is incorporated herein by reference.

While the broad concept of utilizing satellite positioning systems in the surveying field is well known, further advancements in the application of satellite positioning system technology to the surveying field are desired. Specifically, a far more convenient method of identifying selected survey points and permanently marking these points in the field would allow a survey to be accurately and more efficiently completed in a shorter period of time. Current techniques applying satellite positioning system technology to the surveying field utilize hand-held surveying rover receivers which serve to locate the desired survey marks in conjunction with a base receiver unit for real time GPS surveying. The current methodologies require significant investments in time, labor, and personnel, as the rover receiver(s) must be manually carried to the desired area in order to establish the desired survey point. A system for real-time GPS surveying which eliminated the need for manually carrying and placing the rover receivers, thereby reducing the amount of time, labor, and personnel required to conduct a surveying task, would thus be of great utility.

SUMMARY OF THE INVENTION

Accordingly, it is a primary object of the present invention to provide a method and apparatus for surveying overcoming the above described limitations and disadvantages of the prior art.

An additional object of the present invention is to provide a method and apparatus for surveying allowing one to quickly and accurately locate a selected survey point.

Still another object of the present invention is to provide a method and apparatus for reliably and efficiently permanently marking or staking a construction, building or property site accurately at each desired point.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purpose of the present invention as described herein, a surveying apparatus for mounting on a wheeled vehicle is provided. The surveying apparatus includes a prism pole, a gyroscope mounted to the prism pole to enable maintaining the prism pole in a vertical orientation to the earth's surface, a satellite positioning system antenna mounted to the prism pole and a marking device mounted to the prism pole for establishing a survey mark (i.e., building corner or property corner) upon the underlying ground and/or a grade stake for establishing an elevation or grade for a particular point. The surveying apparatus also includes a mounting assembly for securing the prism pole to the wheeled vehicle and an electronic controller.

More specifically describing the invention, the prism pole of the surveying apparatus is secured to the mounting assembly through a gimbal assembly. The gimbal assembly allows the prism pole to be positioned in a vertical orientation in substantially any position of the vehicle with the aid of a gyroscope secured to the prism pole. Additionally, the mounting assembly includes a means for adjusting the position of the prism pole and the gimbal assembly relative to the wheeled vehicle. Preferably, the adjusting means takes the form of a pivot point and a slide which allows substantially infinite fine adjustment within a useful range. As a result, the vehicle needs only to be driven close to the desired survey point and then the adjustment mechanism may be used to efficiently and accurately move and hold the prism pole over the selected survey point.

In the most preferred embodiment, the marker that is mounted to the prism pole is a laser range finder axially mounted adjacent to the lower end of the pole, with a gyroscope secured to the prism pole to allow automatically maintaining a vertical orientation of the prism pole to the earths' surface. When activated, the laser range finder visually images the survey point on the ground, and sends a signal to the controller to adjust the height of the satellite positioning system antenna above said survey point, thus providing the elevation of that point. Of course, other markers could be utilized including, for example, a laser pointer to mark a point at the desired position upon the ground, or a spray paint device which allows the spray painting of the point at the desired position upon the ground. In many situations this could be accomplished without leaving the vehicle.

In the alternative, the surveying apparatus may be described as comprising a prism pole, a satellite positioning system antenna mounted to the prism pole, a mounting assembly for securing the prism pole to the wheeled vehicle, a gyroscope secured to the prism pole which in combination with a self-orienting connection assembly allows the prism pole to be maintained in a vertical orientation, and an electronic controller. As described above, the self-orienting connection assembly is preferably a gimbal assembly although other structures known to be useful for such a purpose could be utilized.

In accordance with a further aspect of the present invention a method is provided for accurately locating and marking a selected survey point upon land. The method includes the steps of temporarily identifying a selected survey point on the ground, aligning a permanent marker over the temporarily identified selected survey point and securing the permanent marker in the ground at the selected survey point. This method may also be further defined as including a step of locating the selected survey point using a satellite positioning system.

Still further, the method may be described as comprising the steps of using a surveying apparatus for locating a selected survey point, maintaining the surveying apparatus in plumb, providing a temporary visual indication of the selected survey point on the ground, maintaining clearance between the surveying apparatus and the selected survey point temporarily visually indicated upon the ground to allow the actual point to be located with a pin, etc., aligning a permanent marker at the selected survey point and securing the permanent marker in the ground at the selected survey point. Still further, the method may include the step of measuring a distance between the surveying apparatus and the selected survey point temporarily visually indicated upon the ground. Knowing this distance allows one to establish the chosen grade where desired.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming part of the specification illustrates several aspects of the present invention and together with the description serves to explain the principles of the invention.

FIG. 1 is a schematical side elevational view of the surveying apparatus of the present invention;

FIG. 2 is a detailed schematical side elevational view of the swivel joint;

Figure 3:
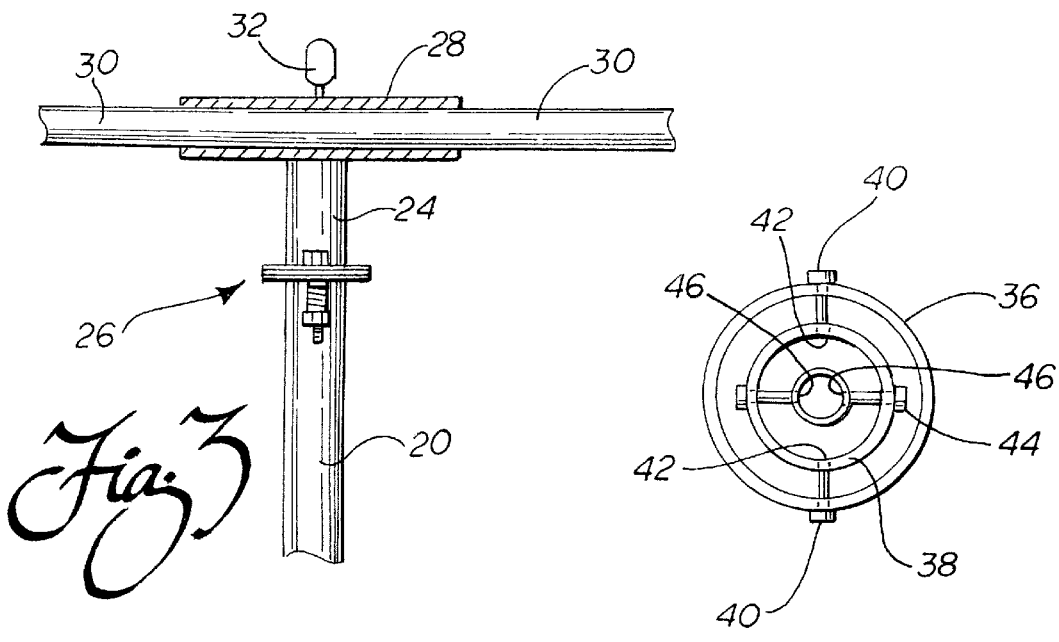
FIG. 3 is a detailed schematical view of the extension arm slide.

Reference will now be made in detail to the present preferred embodiment of the invention, an example of which is illustrated in the accompanying drawing.

DETAILED DESCRIPTION OF THE INVENTION

Reference is now made to the drawing figures showing the surveying apparatus 10 of the present invention. As shown, the apparatus 10 includes a prism pole 12 such as an elongated, rigid, tubular rod formed of metal, plastic or other appropriate material. A satellite positioning system antenna 14 is axially mounted to a first, upper end of the prism pole 12. Such an antenna 14 receives signals from a satellite positioning system such as the Global Positioning System (GPS) or the Global Orbiting Navigational System (GLONASS). well known to those skilled in the art to be useful for surveying purposes. Additionally, a leveling vial 15 incorporating a compass 17 may be axially mounted to the first, upper end of the prism pole 12. Such a leveling vial serves to verify the needed vertical orientation of the prism pole 12 with respect to the earth's surface. A laser range finder 16 is axially received and held in the opposite, lower end of the prism pole. As will become apparent from the following description, the laser range finder 16 may be activated to provide a visual point image upon the underlying ground temporarily indicating and marking the selected survey point, as well as measuring the distance between the survey apparatus 10 and the selected survey point.

The prism pole may be connected to a wheeled vehicle (not shown) such as an automobile, all-terrain-vehicle (ATV), golf cart, tractor, trailer or other similar device by means of a mounting assembly generally designated by reference numeral 18. This allows quick and efficient movement of the equipment from point to point, thereby eliminating the need for an individual to carry the apparatus.

In the embodiment shown, the mounting assembly 18 comprises an upright post 20 having an angle mounting bracket 22 at its lowermost end which may be secured by cooperating nuts and bolts or other fastening means to the body or frame of the wheeled vehicle. A T-shaped tube member 24 is mounted on the upright post 20 by means of a swivel joint 26. As shown in detail in FIG. 2, such a swivel joint 26 may include a first end plate 23 welded or otherwise received on the T-shaped tube member 24, a second, opposing end plate 25 welded or otherwise secured on the upper end of the upright post 20 and an intermediate interface plate 27 of low friction material such as Teflon sandwiched therebetween. A cooperating nut 31 and bolt 32 secure the T-shaped member 24 and post 20 together. A compression spring 29 is concentrically received about the bolt 32. By tightening the nut 31, pressure is increased between the plates 23, 25 and 27, thereby increasing resistance to pivotal movement about the joint 26. Conversely, by loosening the nut 31, pressure is decreased thereby reducing resistance to pivotal movement. Thus, it should be appreciated that a sensitivity adjustment is provided.

Figure 4A:
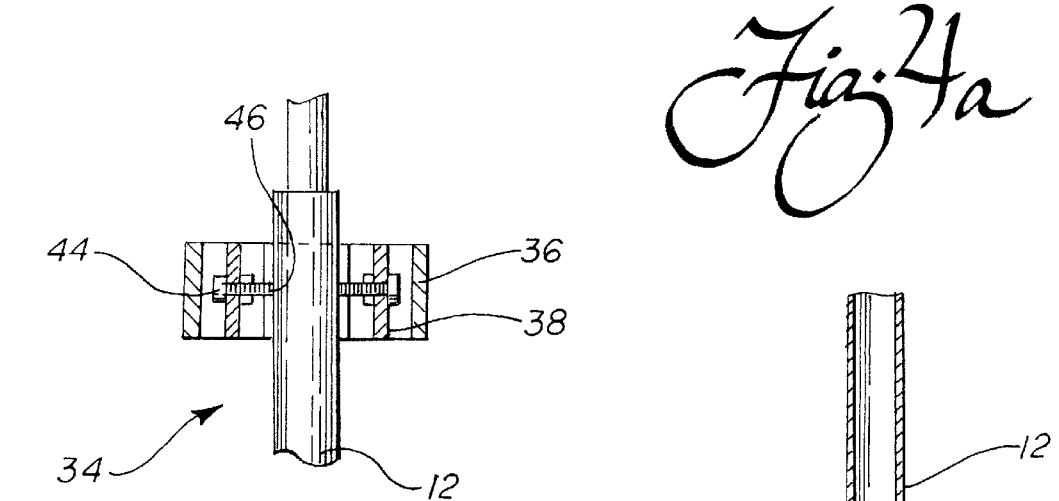
FIGS. 4a and 4b are detailed schematical plan and cross-sectional views of the gimbal assembly.
Figure 4B:
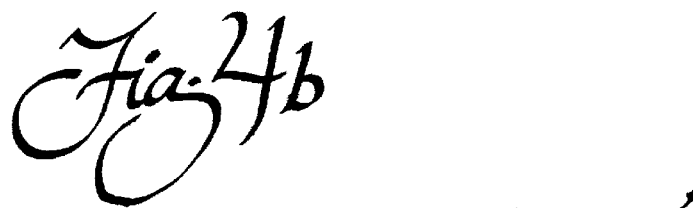

The T-shaped tube member 24 includes a sleeve 28 that concentrically extends around and receives an elongated extension arm 30. The extension arm 30 may be marked on its outer surface by any standard means to calibrate the arm to any desired measurements. Said calibration marks are placed on the extension arm 30 to allow fine positioning of the survey apparatus in known increments. A slide lock thumb screw 32 received in the sleeve 28 may be loosened to allow movement of the extension arm 30 through the sleeve 28 and tightened to secure the extension arm in position relative to the sleeve 28 once a desired position is reached (see also FIG. 3). The distal end of the extension arm 30 carries a self-orienting connection or gimbal assembly 34 (see also FIGS. 4a and 4b) that receives the prism pole 12 while allowing the prism pole to freely assume under the influence of gravity and, more preferably, with the aid and confirmation of a gyroscope 35 secured to the prism pole 12, a vertical orientation regardless of the orientation of the wheeled vehicle to which the surveying apparatus 10 is mounted.

The gimbal assembly 34 comprises two concentric rings 36, 38. The outer ring 36 is welded or otherwise secured to the extension arm 30. A pair of opposed bolts 40 with pointed ends engage opposed bearings 42 in the inner ring 38. Thus, the inner ring 38 pivots freely about a first axis A defined by the bolts 40 and bearings 42. The inner ring 38 includes a pair of opposed bolts 44 with pointed ends that engage opposed bearings 46 in the prism pole 12. Thus, the prism pole 12 is free to rotate about a second, perpendicular axis B running through the bolts 44 and bearings 46. As a result, the prism pole 12 is free to assume a vertical orientation as determined by a gyroscope 35 secured to the prism pole 12.

In addition, the apparatus 10 preferably includes an electronic controller 50, such as a DAP Microflex PC 9500 data collector, NOVAtel Outrider-DLGPS System by NIKON. Said controller 50 includes a microprocessor, a data memory, a viewing screen and a key pad for data entry and operates under direction of an appropriated dedicated chip or software such as the Surv Star Software by Carlson Software. Leads 52 provide electronic signal connection between the antenna 14 and the controller 50. The controller 50 may be mounted to the upright post 20 by any of a number of known means. In a preferred embodiment of the present invention, the controller 50 is mounted to the upright post 20 by use of an extension arm apparatus comprising a flat plate with an extension arm 55, which is attached to the upright post 20 by means of a horizontal swivel, allowing the operator to view the screen of the controller while seated in the vehicle yet also allowing the controller to be swung around to provide a view of the screen while standing on the ground during the fine positioning phase. The controller may be mounted to the flat plate by any of a number of conventional means. In a currently preferred embodiment, the controller 50 is mounted to the flat plate 55 by means of a number of hook-and-loop type fastener strips attached to the flat plate, allowing easy removal of the controller if desired.

The use of the present invention will now be described in detail. Initially, the surveyor carefully reviews the design concept for a project then collects site data typically by means of conventional EDM survey using a theodolite with distance measuring ability and/or a vehicle mounted global positioning satellite surveying system where terrain and obstacles permit.

The X, Y and Z coordinates for the locating of roads, utilities and property corners are established for the property on a plot in accordance with the principals well known to those skilled in the surveying art. This allows the later identification of selected survey points in the field using the apparatus 10 of the present invention.

Next is the staking or layout of the property. This is accomplished by utilizing the design and site data previously collected and now downloaded from the office personal computer into the data collector or controller 50 such as the DAP Microflex PC9500, NOVAtel Outrider-DL GPS system by NIKON using Surv Star Software by Carlson Software.

Upon reaching the survey site, a base GPS receiver unit 54 is properly erected at a selected location. The X, Y and Z coordinates of the base receiver unit are then properly established by obtaining signals from at least four or five satellites of the GPS or other satellite positioning system depending upon the type of controller and software utilized. The apparatus 10 of the present invention may be mounted to a wheeled vehicle for ease of mobility and to eliminate the need to manually carry the equipment in a backpack or by some other arrangement. Accordingly, the antenna 14 functions as a rover receiver. Radio communication is then established between the base receiver unit and the rover receiver (i.e., antenna 14 and controller 50) in order to allow real time GPS surveying.

In order to accomplish this goal it is first necessary to align the X, Y and Z coordinates in the base and rover receivers with two known points or ground positions located at the job site. Next, the controller 50 is utilized to enter the stake mode. When this is done, the GPS system will provide bearing and distance directions for the previously designed or selected points. As the selected survey point is approached, the distance indication lessens. At the selected survey point the distance heading will be near zero. The approach to the targeted point is accomplished by driving the vehicle in the indicated direction. When the distance heading is within approximately one-half foot of zero the vehicle is stopped and the fine adjustment mechanism of the apparatus 10 of the present invention including the swivel joint 26 and extension arm 30 are adjusted to accurately center the prism pole 12 over the selected or desired survey point. The gimbal assembly 34, of course, in conjunction with the gyroscope 35, insures that the prism pole 12 is in a proper vertical orientation for proper and accurate measurement.

Figure 5:
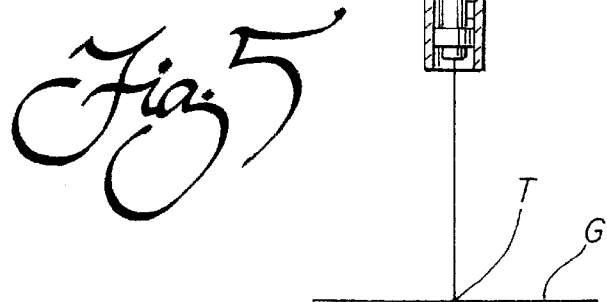
FIG. 5 is a detailed cross-sectional view of a laser range finder axially mounted in the lower end of the prism pole.

Once the X, Y location is established, the cut or fill (Z coordinate position) is taken from the controller 50 based on the data provided by the laser range finder 16. This data would be the actual heights of the satellite antenna 14 above the target ground point. In the alternative, this may be accomplished by measuring the height of the satellite antenna 14 with a mounted tape measure to obtain the actual height of the satellite antenna 14 above the target ground point and adjusting the stored height in the controller 50 to the measured height thus obtaining the actual cut on fill required at the selected survey or target point. If an exact location is required, such as to establish a building corner or property corner, the laser range finder 16, or in the alternative a laser pointer, is activated to provide a visual indication of the target point T upon the underlying ground G (see FIG. 5). A steel pin or stake may then be accurately driven at the point and with relative convenience since sufficient clearance exists between the lowermost end of the prism pole 12 and the top of the properly aligned stake to allow free driving with a hammer.

In the event a less accurate point will suffice such as when setting preliminary grade stakes, an axially mounted spray paint applicator 16' could be utilized as a substitute for the laser to establish a visual target point on the ground for receiving a grade stake. The spray paint applicator 16' could be activated by means of an electric solenoid (not shown) so that the point may be marked on the ground without leaving the vehicle, if desired.

In accordance with a further aspect of the invention, the controller 50 may be mounted on the vehicle by means of a horizontal swivel that will allow the operator to view the screen of the controller while seated on the vehicle yet also allow the controller to be swung around to provide a view of the screen while standing on the ground during the fine positioning phase.

The power required to operate the controller 50 may be derived from the vehicle electrical system by means of a power cord and adaptor of a type well known in the art. A simple magnetic compass system manufactured for installation in an automobile may be mounted in the vehicle to provide a heading to proceed to the target points in accordance with the heading indicated by the controller. This procedure is then repeated until all the selected survey points are established.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a tape measure could be mounted adjacent the lowermost end of the prism pole 12 in order to allow measuring of the distance between the lowermost end of the prism pole and the ground. Of course, the tape measure would be counterbalanced to maintain plumb. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A surveying apparatus for mounting on a wheeled vehicle comprising:
   a prism pole;
   a satellite positioning system antenna mounted to said prism pole;
   a marker mounted to said prism pole for establishing a survey mark/grade stake upon underlying ground;
   a mounting assembly for securing said prism pole to said wheeled vehicle; and
   an electronic controller.

2. The surveying apparatus of claim 1 further including:
   a leveling vial incorporating a compass mounted to said prism pole; and
   a gyroscope mounted to said prism pole for maintaining said prism pole in a vertical orientation.

3. The surveying apparatus of claim 1, wherein said prism pole is secured to said mounting assembly through a gimbal assembly that allows said prism pole to freely assume a vertical orientation.

4. The surveying apparatus of claim 1, wherein said mounting assembly includes a means for adjusting the position of said prism pole relative to said wheeled vehicle.

5. The surveying apparatus of claim 1, wherein said mounting assembly further includes a pivot point and a slide allowing adjustment of the position of said prism pole relative to said vehicle.

6. The surveying apparatus of claim 1, wherein said mounting assembly includes an adjustor for adjusting the position of said prism pole relative to said wheeled vehicle.

7. The surveying apparatus of claim 1, wherein said marker is a laser range finder carried axially adjacent an end of said prism pole.

8. The surveying apparatus of claim 1, wherein said marker is a laser pointer.

9. The surveying apparatus of claim 1, wherein said marker is a spray paint device.

10. A surveying apparatus, comprising:
    a prism pole;
    a satellite positioning system antenna mounted to said prism pole;
    a mounting assembly for securing said prism pole to a wheeled vehicle;
    a self-orienting connection assembly that allows said prism pole to freely assume a vertical orientation; and
    an electronic controller.

11. The surveying apparatus of claim 10, further including a leveling vial incorporating a compass mounted to said prism pole.

12. The surveying apparatus of claim 10, wherein said self-orienting connection assembly is a gimbal assembly.

13. The surveying apparatus of claim 10, wherein said mounting assembly includes a means for adjusting the position of said prism pole relative to said wheeled vehicle.

14. The surveying apparatus of claim 10, wherein said mounting assembly further includes a pivot point and a slide allowing adjustment of the position of said prism pole relative to said vehicle.

15. The surveying apparatus of claim 14 further including a base receiver unit.

* * * * *